United States Patent [19]
Carducci

[11] Patent Number: 5,421,539
[45] Date of Patent: Jun. 6, 1995

[54] CARGO CONVERSION SYSTEM FOR PASSENGER AIRCRAFT

[76] Inventor: Robert F. Carducci, 8 Prince Andrew Drive, Caledon East, Ontario, Canada, L0N 1E0

[21] Appl. No.: 104,640

[22] Filed: Aug. 11, 1993

[51] Int. Cl.[6] .................................................. B64C 1/22
[52] U.S. Cl. ................................ 244/118.1; 244/118.2
[58] Field of Search ............... 244/118.1, 118.2, 118.5, 244/118.6, 121; 410/117, 118, 130

[56] References Cited

U.S. PATENT DOCUMENTS

| | | | |
|---|---|---|---|
| 2,669,402 | 2/1954 | Del Mar | 244/121 |
| 3,294,034 | 12/1966 | Bodenheimer et al. | 244/118.1 |
| 3,480,239 | 11/1969 | Jensen et al. | 244/118.1 |
| 4,265,577 | 5/1981 | Loomis | 410/130 |
| 4,483,499 | 11/1984 | Fronk | 244/118.1 |
| 4,799,631 | 1/1989 | Humphries et al. | 244/118.5 |
| 5,085,382 | 2/1992 | Finkenbeiner | 244/118.1 |
| 5,090,639 | 2/1992 | Miller et al. | 244/118.1 |
| 5,108,048 | 4/1992 | Chang | 244/118.1 |
| 5,131,606 | 7/1992 | Nordstrom | 244/118.1 |
| 5,169,091 | 12/1992 | Beroth | 244/122 |

FOREIGN PATENT DOCUMENTS

| | | | |
|---|---|---|---|
| 2303711 | 10/1976 | France | 244/118.1 |
| 2913050 | 10/1980 | Germany | 244/118.1 |
| 3007733 | 9/1981 | Germany | 244/118.5 |

OTHER PUBLICATIONS

Dash 8 Cargo Loading Manual PSM 1-8-8A, De Havilland Aircraft of Canada, Jun. 28, 1985 (Jun. 1990 revision).

*Primary Examiner*—Michael S. Huppert
*Assistant Examiner*—Anne E. Bidwell
*Attorney, Agent, or Firm*—Ridout & Maybee

[57] ABSTRACT

A system for converting all or part of a passenger cabin in a fuselage of an aircraft for the carriage of freight, the cabin having internally finished longitudinal walls and ceiling defining an internal cross-sectional profile of substantially uniform cross-section. The system includes a dismountable rigid liner structure having an external profile receivable within the internal profile of the cabin without contacting the walls and ceiling. It is formed of interlocking modules individually small enough to pass through a cargo door in the fuselage and is supported between ends of the cabin solely by releasable anchorages engaging seat tracks installed in the cabin, the liner structure including transverse cargo restraints releasably secured thereto for restraining movement of cargo through said liner structure. The modules form a series of longitudinally connected compartments, each compartment including a truss element and anchors for securing a cargo restraint at its front end, the rearmost compartment being closed at its rear end by a cargo restraint connected to the fuselage of the aircraft in place of a removable rear cabin bulkhead, which may be relocated ahead of the liner structure if only a part of the cabin is converted.

11 Claims, 5 Drawing Sheets

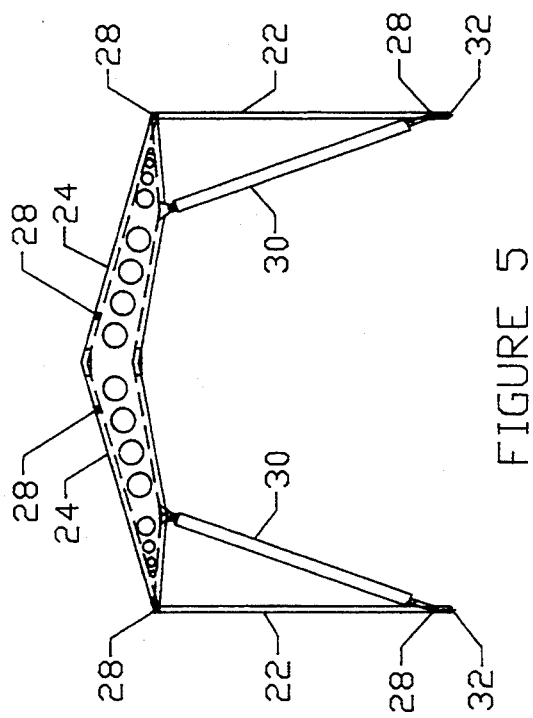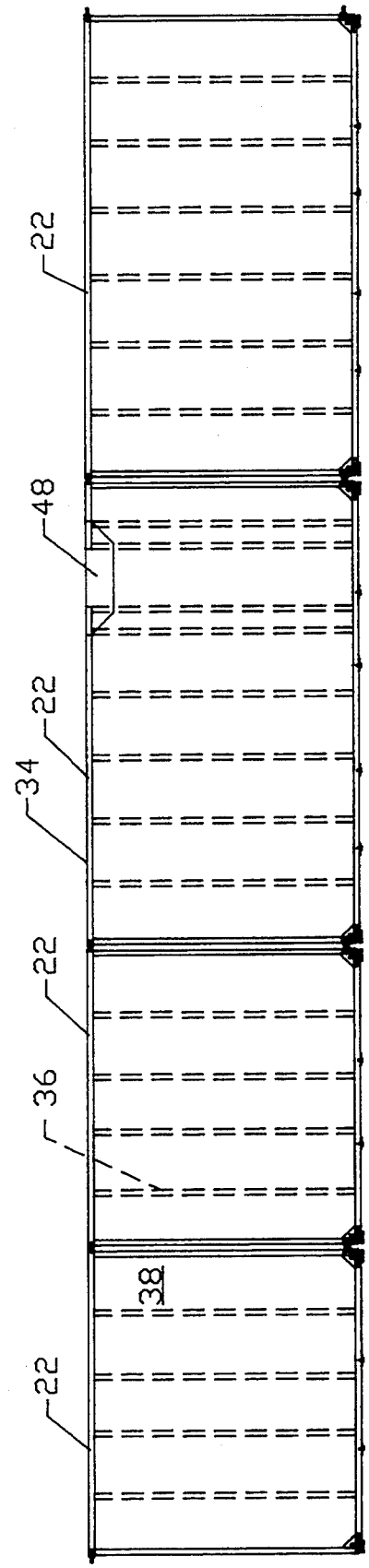
FIGURE 5
FIGURE 6

CARGO CONVERSION SYSTEM FOR PASSENGER AIRCRAFT

BACKGROUND OF THE INVENTION

1. Field of the Invention

This invention relates to systems for the rapid conversion of aircraft from passenger carriage to freight carriage and vice-versa.

2. Review of the Art

The high capital cost of passenger aircraft means that economic operation requires high utilization, and the ability to convert an aircraft between passenger and freight carriage can assist in improving utilization. So-called commuter aircraft present a particular problem in this regard, since the type of short range passenger traffic to which they cater is substantially a daytime traffic, leaving the aircraft unused at night. Nighttime traffic is frequently available in the form of courier and parcel traffic, but only if the aircraft can be converted between passenger and freight carriage sufficiently rapidly to enable both traffic to be carried within a single day. An alternative solution is to increase the size of the freight compartment within the aircraft at the expense of the passenger compartment, which represents a compromise and fails to exploit the capacity of the aircraft effectively for either passengers or freight, unless the relative proportions of passenger and freight space can be rapidly varied to suit demand.

When large aircraft are converted for freight carriage, provision is made for the freight to be loaded on pallets or in containers which are anchored to the aircraft structure; an exemplary arrangement is that shown in U.S. Pat. No. 3,480,239 (Jensen et al). If maximum freight storage is to be provided, it may be desirable to remove overhead baggage storage lockers, and U.S. Pat. No. 5,108,048 (Chang) discloses a system for facilitating the removal and reinstallation of such lockers.

In small aircraft, courier or parcel traffic will commonly be manually loaded rather than being palletised or containerised, and indeed such aircraft commonly have cargo doors which are neither of sufficient dimensions nor conveniently located to accept pallets or containers of any substantial size. Loose loaded packages, or packages in small bags or containers, on the other hand, both require the available cargo space to be divided by adequately anchored restraining nets, for example as shown in U.S. Pat. No. 2,669,402 (Del Mar), and also require that any internal finish of the aircraft passenger cabin that remains installed be adequately protected from damage by the cargo. It is difficult, if not impossible, to provide suitable anchorages for cargo nets to the fuselage of the aircraft through the cabin finish without impairing the appearance of the latter and giving it a makeshift appearance whilst the aircraft is functioning as a passenger carrier. Significant dismantling of the interior finish of the cabin is not practicable as part of a rapid and reversible conversion system.

U.S. Pat. No. 4,483,499 (Fronk) discloses a system for converting small passenger aircraft for the carriage of patients and cargo by the attachment of rack like structures to tracks in the aircraft normally utilized to secure its seats. Fronk is primarily concerned with providing means for converting an aircraft for air ambulance purposes, and overcoming the problem of loading stretchers through relatively small doors or hatches. Whilst his racks could be utilized for securing cargo, they are unsuitable for the storage of loose cargo of the kind presently contemplated, would provide little protection to the internal finish of the aircraft, and themselves occupy valuable cargo space.

Both the Fronk and Jensen patents make use of seat tracks provided longitudinally of the passenger cabin of the aircraft to secure their freight conversion equipment. These tracks are used to secure, releasably, passenger seating, in a manner which permits the seating of an aircraft to be rapidly removed or rearranged. Examples of such tracks, and fastenings for use with them, are shown in U.S. Pat. Nos. 5,131,606 (Nordstrom) and 5,169,091 (Beroth).

SUMMARY OF THE INVENTION

It is an object of the present invention to provide a system for rapidly converting all or part of a passenger cabin of an aircraft between carriage of passengers and carriage of loose freight, the interior finish of the cabin being protected during freight carriage, and anchorages being provided for freight restraining nets without any requirements for access to such anchorages through the cabin finish.

Accordingly, the invention provides a system for converting at least part of a passenger cabin in a fuselage of an aircraft for the carriage of freight, the cabin having internally finished longitudinal walls and ceiling defining an internal cross-sectional profile of substantially uniform cross-section, said system comprising a dismountable rigid liner structure having an external profile receivable within said internal profile in non-contacting relation to said longitudinal walls and ceiling, and being formed of interlocking modules individually small enough to pass through a door in the fuselage providing access to the cabin, said structure being supported between ends of the cabin solely by releasable anchorages engaging seat tracks installed therein for supporting passenger seating in the cabin, the liner structure including transverse cargo restraints releasably secured thereto for restraining longitudinal movement of cargo through said liner structure.

Preferably the system is formed by modules forming a series of longitudinally connected compartments, each compartment including a roof truss and means for securing a cargo restraining net at its front end, the rearmost compartment being closed at its rear end by a restraining structure locked to the fuselage of the aircraft, preferably in place of a removable rear cabin bulkhead.

Further features of the invention will be apparent from the following description of a preferred embodiment thereof with reference to the accompanying drawings.

SHORT DESCRIPTION OF THE DRAWINGS

In the drawings:

FIG. 5 is an end elevation of a roof truss showing its relation to side and roof panels; and FIG. 6 is a side elevation of the side panels along one side of the cabin.

DESCRIPTION OF THE PREFERRED EMBODIMENT

The embodiment of the invention to be described is particularly adapted to installation in the De Havilland Dash 8 (trademark) aircraft from Boeing Canada, but those skilled in the art will appreciate that the components of the system can readily be dimensioned for other commuter type aircraft.

Figure 1A:
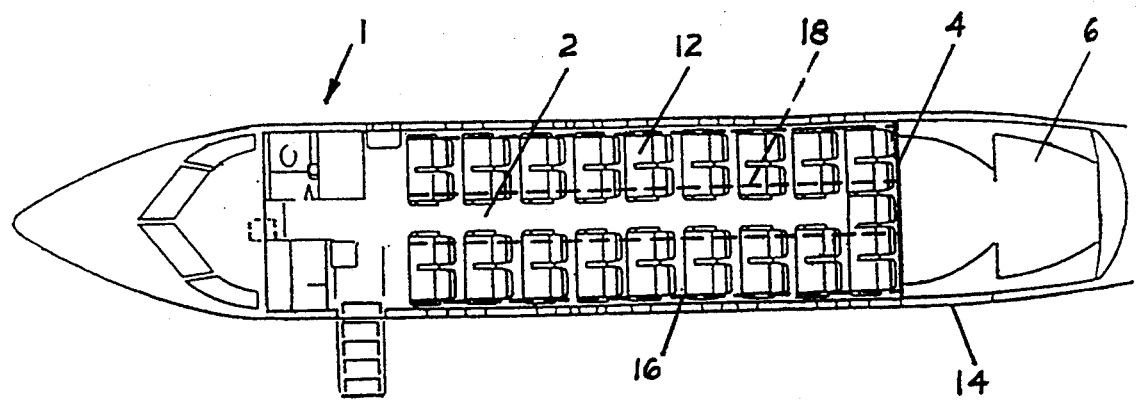
FIGS. 1A and 1B are horizontal and vertical longitudinal sections through the fuselage of a commuter passenger aircraft suitable for application of aconversion according to the invention.
Figure 1B:
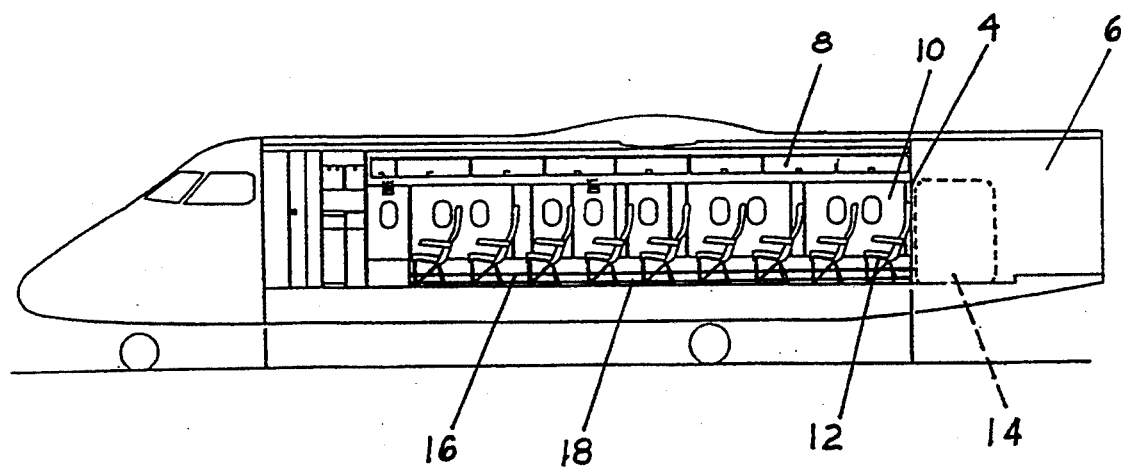

FIGS. 1A and 1B show a typical configuration of the fuselage 1 of such an aircraft, with a passenger cabin 2 of substantially uniform cross-section divided by a removable rear bulkhead 4 locked to the fuselage from a rear freight or baggage compartment 6. In fact the rear bulkhead may be located in alternative positions further forward to increase the size of the freight compartment, in which case the walls and ceiling of the fuselage will not necessarily be finished to the rear of the bulkhead. Whether or not the fuselage is finished to the rear of the bulkhead, the system of the invention may be used aft of the bulkhead to protect the finish if present and to provide a configuration allowing an increased cargo load by providing means for supporting additional cargo restraints. The present invention is concerned with utilising passenger cabin space, whether internally finished or not, in the fuselage ahead of a dedicated baggage compartment, for freight carriage, without the necessity for stripping or mutilating cabin finish that is present, for example locker assemblies 8 and wall panels 10. If the bulkhead 4 is relocated forwardly of the rear end of the cabin space, then the system may be used to convert space to the rear of the bulkhead. All that is necessary to prepare the aircraft for installation of the system of the invention, or to restore it for passenger operation after removal of the system, is to remove, relocate or reinstall the rear cabin bulkhead 4 and seating units 12, which may readily be removed or reloaded through a rear cargo door 14 when the bulkhead is removed. These routine procedures may be easily and rapidly carried out in accordance with instructions provided by the aircraft manufacturer. The seating units to either side of a central aisle are each secured in pairs of conventional outboard and inboard seat tracks 16 and 18 extending longitudinally along the cabin, which tracks are available for other purposes once the seating units are removed.

The system of the invention consists of a number of modules forming end to end compartments, and of such a size that they can readily be loaded through the cargo door of the aircraft. The compartments provide a rigid lining within the passenger compartment which protects and stands clear of the finish of its walls and ceiling.

Figure 2:
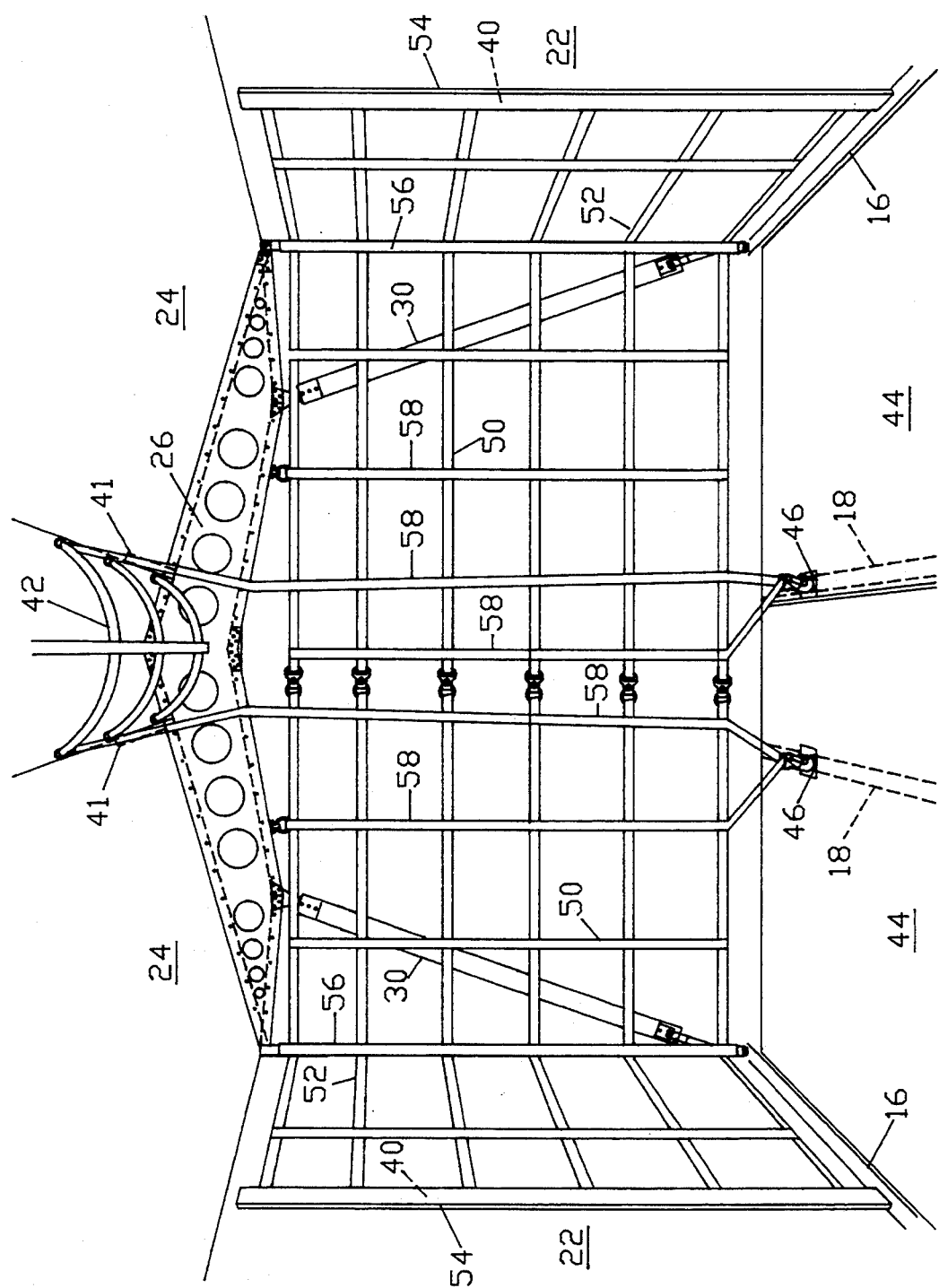
FIG. 2 is a perspective view looking forward through a front compartment of a system according to the invention.
Figure 4:
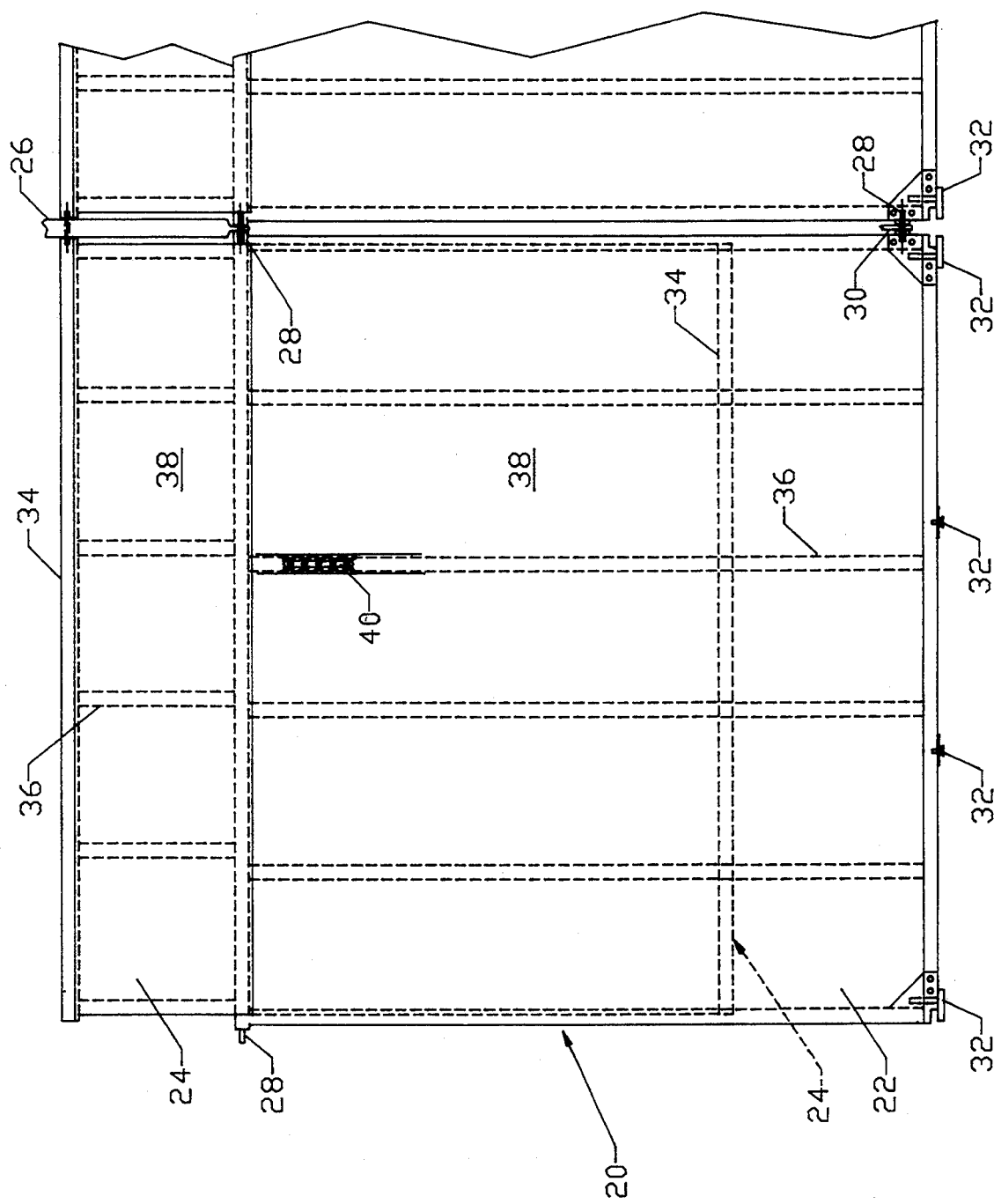
FIG. 4 is a side elevation of wall and roof panels used in the system.

Each compartment comprises three principal modules. Two of these are port and starboard panel assemblies 20, each formed by a wall panel 22 and a narrower roof panel 24 hingedly connected to brackets at the top edge of the panel 22 so that it may be moved from a folded position shown in broken lines in FIG. 4 to a deployed position shown in full lines in FIG. 4, as well as in FIG. 2. The assemblies 20 are held in deployed position by a roof truss 26 of dihedral form, formed with sockets through which pass pins 28 formed on the forward edges of the panels 22 and 24 of the forwardmost compartment, in the case of the forwardmost truss, or pins 28 formed on the aft edges of the panels of the next forward compartment in the case of each following compartment. Fittings 32 on the bottom edges of the side panels 22 are locked into engagement with the outboard seat tracks 16. Each truss has two telescopically adjustable struts 30 hinged at their upper ends to its lower edge, and eyes at the lower ends of these struts are secured to the side panels 22 near the bottom of their front edges by engaging pins 28 at those locations and adjusted so as to brace the compartment concerned into a rigid structure locked to the seat tracks 16 and clear of the lockers 8 and wall panels 10.

The panels 22 and 24 are formed of typically of aluminum with a peripheral frame 34, stiffeners 36 and a skin 38 presenting a smooth inner surface. The second from front stiffener supports a length of seat track 40 secured to it through the skin and shown fragmentarily in FIG. 4, for a purpose described later. Individual panels may be modified as necessary to accommodate features of the structure of a particular aircraft, for example as shown at 48 in FIG. 6.

Once the forwardmost compartment has been erected, the compartment behind it can be erected by first fitting its truss 26 and associated struts to the pins 28 at the aft edges of the panels of the forwardmost compartment, and then unfolding its panel assemblies 20 and locking the panels 22 to the tracks 16 with the pins 28 passing through the truss 26 and anchorages of the struts 30 into sockets in the forward edges of the panels. This procedure is repeated until all of the compartments, four in this example, have been erected. The foremost truss and its struts as well as all top panels are further secured to their adjacent panels by releasable tension straps 41. Gaps between the roof panels, left to allow existing cabin lighting to illuminate the interior of the compartments, are bridged by connecting roof nets 42, preattached to one roof panel in each compartment, to the other roof panel and to adjacent roof trusses at each end. This avoids the possibility of loose freight being thrown upwardly through the gap in rough air conditions.

To protect the floor of the cabin and improve its local bearing capacity, floor panels 44 may be installed within the compartments. Conveniently, two panels cover the width of the floor, and are secured by anchors 46 engaging inboard seat tracks 18 through slots in the plates. For each compartment, these anchors are approximately longitudinally aligned with the tracks 40 on the panels 22.

In use, the compartments are loaded sequentially from the front. Before each compartment is loaded with cargo brought in through the cargo door 14, its front end is closed by a cargo restraining net 50. Typically these nets are formed in port and starboard portions connected by quick release connectors along a centre line, and outer ends of horizontal straps 52 are each connected to fastener bars 54 having fittings releasably with the tracks 40. These straps 52 are also held against front portions of the panels 22 by vertical rods 56 releasably locked at their lower ends by eye bolts engaging slots in the tubes to the forward edges of the panels 22, and at their upper ends by seat track fittings engaging seat track segments secured to the panels 22. Vertical straps 58 of the nets are secured at their top ends to the truss 26 of the compartment or to points on the roof panels 24 approximately longitudinally aligned with the tracks 40, and at their other ends to the anchors 46. The arrangement is such that under normal circumstances the net closes the front end of the compartment, but in the event of cargo being projected forward against the net, inward forces will be applied to the rods 56. When these forces rise above a predetermined minor proportion of the rated load of the net, the rods will bend and become detached from the panels 22, allowing the net to assume a sling shape. This in turn greatly reduces the lateral component of the loading applied to the panels 22 and enables panels of less strength than would otherwise be required to withstand without buckling the loading which could be applied by the nets in the absence of this feature.

Figure 3:
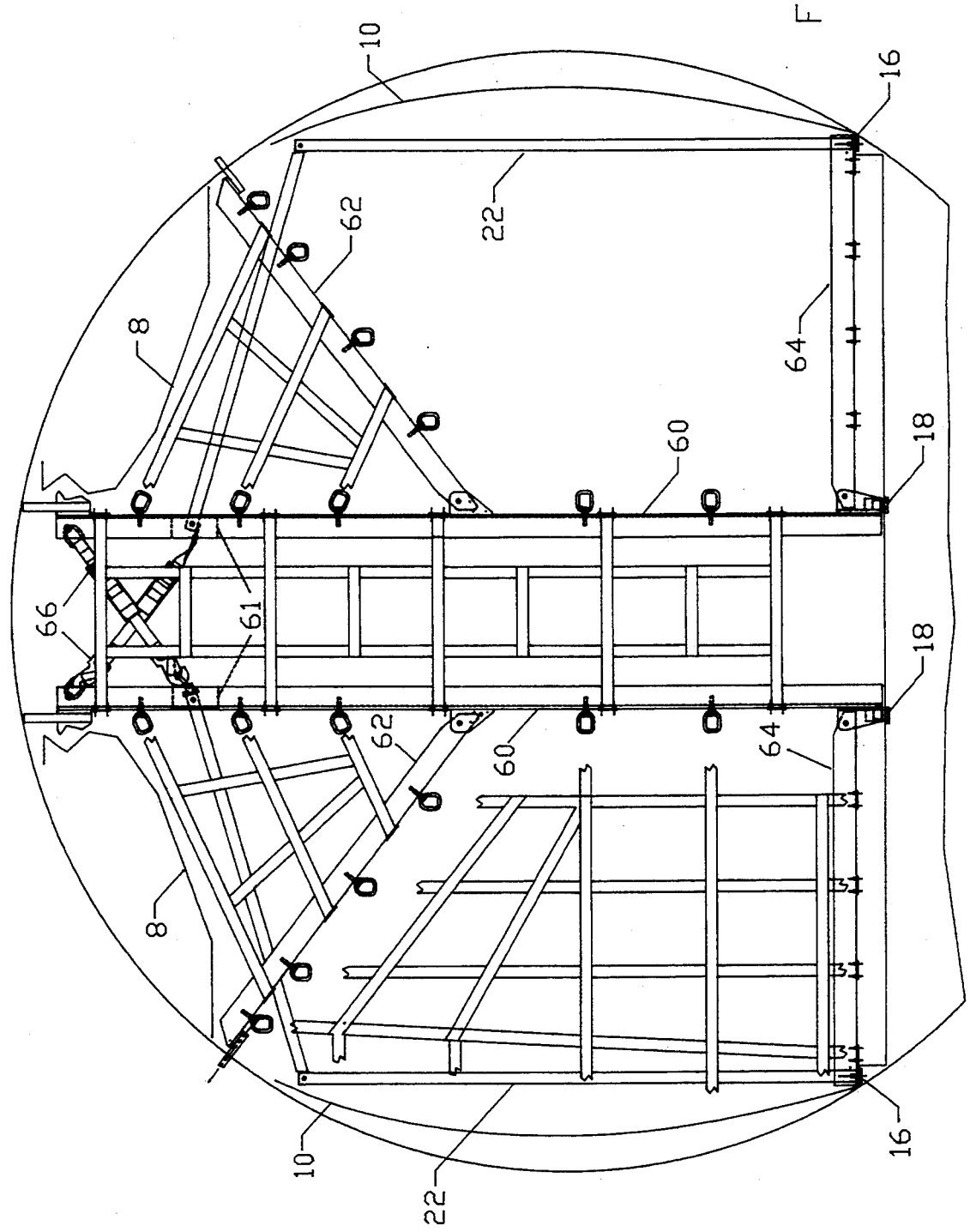
FIG. 3 is a rear elevation of the system, shown in relation to outlines of the aircraft fuselage and internal cabin finishing panels.

Once all of the compartments are loaded, frames and nets forming a cargo restraint to replace the bulkhead 4 are installed (see FIG. 3). Port and starboard frames each comprise a vertical member 60 which is installed so as to extend between an attachment point for the bulkhead and the track 18, and upper and lower hinged arms 62 and 64 which are locked to a further attachment point for the bulkhead and to the track 16 respectively. Cargo restraint nets are fastened between the vertical members 60, between the members 60 and the arms 62, and between the vertical members 60, the arms 62 and 64, and via breakaway anchorages to the aft edges of panels 22 or other conveniently located structure, to existing anchorages, not shown, in the cargo compartment rearward of the frames. The inner rear corners of the panels 24 of the rear compartment bear against angle brackets 61 on the vertical members 60, and are secured against the brackets by tightening diagonal straps 66 extending diagonally to the top of the opposite member 60.

All of the various straps and locking devices used in the assembly employ conventional quick release tensioning buckles, snap connectors and quick release locking pins. Tests with a prototype system have shown that a Dash 8-100 aircraft can be converted from passenger to freight carriage in little more than an hour, including removal of the bulkhead and seats, and converted back in much the same time, with only three people working in the aircraft. This timing makes night time freight haulage between daytime passenger carriage entirely practicable. The rigid structure erected within the fuselage can readily be made strong enough to meet cargo restraint requirements, particularly when used in conjunction with the two stage anchorages for the restraint nets described above.

Whilst the system has been described in relation to a particular application to a particular aircraft, variations within this application, or to suit other aircraft, may be made within the scope of the appended claims. For example, the nets shown and described could be replaced by other suitable cargo restraints, or located differently within the compartments.

I claim:

1. A system for converting at least part of a passenger cabin in a fuselage of an aircraft for the carriage of manually loaded or pre-packaged freight, the cabin having internally finished longitudinal walls and ceiling defining an internal cross-sectional profile of substantially uniform cross-section, said system comprising a dismountable rigid liner structure formed of portable interlocking parts individually small enough to pass through a door in the fuselage providing access to the cabin, said parts being erected in situ within the cabin and coacting in a resulting erected structure to define an external cross-sectional profile receivable within the said internal profile in spaced non-contacting relation to said longitudinal walls and ceiling, said erected structure being supported between ends of the cabin solely by releasable anchorages engaging seat tracks installed therein for supporting passenger seating in the cabin, the liner structure including transverse cargo restraints releasably secured thereto for limiting longitudinal movement of cargo through said liner structure.

2. A system according to claim 1, wherein the liner structure includes a restraining structure at a rear end thereof secured to the fuselage of the aircraft at a rear end of the cabin.

3. A system according to claim 2, wherein said restraining structure comprises vertical members defining an opening between them, each having folding arms, the vertical members and arms having means for engaging attachment points for a removable rear bulkhead of the passenger cabin.

4. A system according to claim 1, wherein the liner structure is formed by sets of parts forming multiple longitudinally adjoining compartments, each set including wall and roof panels and a transverse roof truss.

5. A system according to claim 4, wherein in each compartment the transverse roof truss is interlocked with the wall and roof panels at a front end of the compartment, and a transverse cargo restraint is secured to the wall and roof panels at a front end of the compartment.

6. A system according to claim 5, wherein end edges of wall and roof panels of a compartment adjacent each truss have pins passing through apertures defined in the truss and into sockets defined in end edges of wall and roof panels of any adjacent compartment.

7. A system according to claim 6, wherein each truss is further connected to struts connected between said truss and pins extending between adjacent wall panels.

8. A system according to claim 5, wherein in each compartment the cargo restraint is a net secured to wall and roof panels at points aft of forward ends of the panels, and further secured to forward ends of the wall panels by means sufficiently weak to release the net to assume a sling configuration when the latter is subjected to forces by forward shifting cargo which exceed more than a predetermined fraction of the restraining capacity of the net.

9. A system according to claim 4, wherein each compartment comprises port and starboard wall panels respectively hingedly connected to port and starboard roof panels, the roof panels being secured in spaced apart relationship by the truss.

10. A system according to claim 4, wherein each set of parts further includes floor panels overlying a floor of a cabin.

11. A system according to claim 10, wherein the floor panels define slots providing access to seat tracks beneath said slots for anchor members which also serve as anchor members for said cargo restraints.

* * * * *